United States Patent [19]

Uzuka

[11] 4,282,464

[45] Aug. 4, 1981

[54] REVERSIBLE DRIVE CIRCUIT FOR BRUSHLESS DC MOTOR

[75] Inventor: Mitsuo Uzuka, Tokyo, Japan

[73] Assignee: Sony Corporation, Tokyo, Japan

[21] Appl. No.: 133,415

[22] Filed: Mar. 24, 1980

[30] Foreign Application Priority Data

Mar. 24, 1979 [JP] Japan .................................. 54/34941

[51] Int. Cl.³ ............................................. H02P 6/02
[52] U.S. Cl. ................................... 318/138; 318/254; 318/439; 318/288
[58] Field of Search ................ 318/138, 254, 256, 280, 318/288, 289, 290, 293, 294, 439, 496, 498, 506, 507, 532

[56] References Cited

U.S. PATENT DOCUMENTS

| 3,831,072 | 8/1974 | Tanikoshi | 318/138 |
| 4,066,935 | 1/1978 | Takaoka et al. | 318/138 |
| 4,105,940 | 8/1978 | Kühnlein | 318/254 |

FOREIGN PATENT DOCUMENTS 1248755 10/1971 United Kingdom .

*Primary Examiner*—J. V. Truhe
*Assistant Examiner*—John W. Redman
*Attorney, Agent, or Firm*—Lewis H. Eslinger; Alvin Sinderbrand

[57] ABSTRACT

A brushless DC motor includes a rotor adapted to rotate about an axis and having a plurality of magnets for generating a magnetic flux; a stator having at least two coils through which an alternating signal is applied for rotating the rotor about its axis; and a reversible drive circuit for regulating the alternating signal through the coils and which includes first and second switching transistors for energizing the coils with the alternating signal, a rotational position sensing circuit for generating a position signal corresponding to the rotational position of the rotor, a rotational direction selecting circuit for producing a control signal corresponding to a desired rotational direction of the rotor, an NPN switch control transistor responsive to the position signal and control signal for alternately switching the first and second switching transistors so as to rotate the rotor in the forward direction, and a PNP switch control transistor in parallel with the NPN switch control transistor and responsive to the position signal, the control signal and an output from the NPN switch control transistor for alternately switching the first and second switching transistors so as to rotate the rotor in the reverse direction.

20 Claims, 14 Drawing Figures

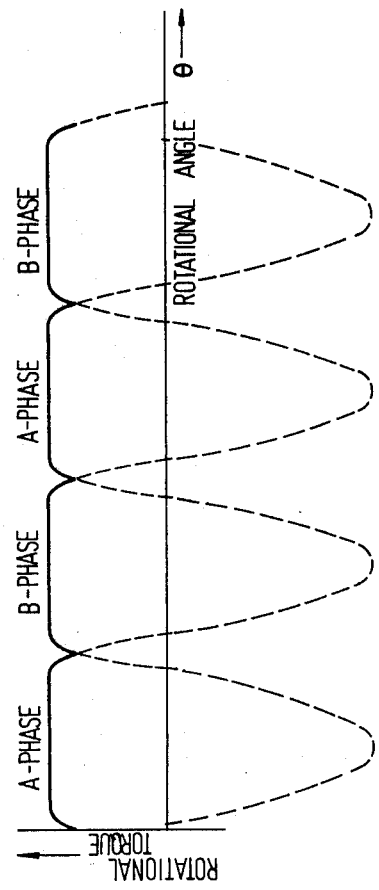
FIG.3 PRIOR ART
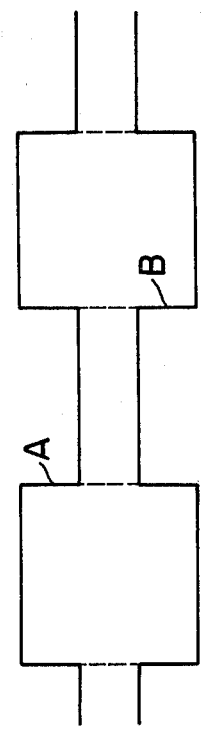
FIG.4A PRIOR ART
FIG.4B

REVERSIBLE DRIVE CIRCUIT FOR BRUSHLESS DC MOTOR

BACKGROUND OF THE INVENTION

1. Field of the Invention

This invention relates generally to brushless DC motors and, more particularly, is directed to an improved circuit for driving a brushless DC motor in the forward and reverse directions.

2. Description of the Prior Art

Various types of brushless DC motors are known with such motors generally including at least one pair of magnetic poles, usually formed of permanent magnet north and south pole pieces, secured to the rotor and corresponding energizable coils disposed on the stator with each coil having conductor segments for carrying current in directions which are normal to the magnetic flux generated by the permanent magnet pole pieces. For example, in a 2-pole alternate phase brushless DC motor, a single pair of magnetic poles, comprised of a permanent magnet north pole piece and a permanent magnet south pole piece, may be formed with each pole piece occupying an electrical angle of 180° on the rotor and with two alternately energizable coils also provided on the stator with each coil subtending an arc of 180 electrical degrees. The rotor is thus caused to rotate relative to the stator by a torque produced by the interaction of magnetic flux generated by the pole pieces and the current flow through the coils with the direction of rotation being perpendicular both to the direction of magnetic flux and the direction of current flow.

It is often desirable, in such brushless DC motors, to provide means whereby the rotor can selectively be rotated in either of its forward or reverse rotational directions. Although the direction of rotation of the rotor can be changed by reversing the direction of current flow through the coils, as a practical matter, this cannot be done. That is, in brushless DC motors of the type above-described, switching elements such as transistors are provided for alternately energizing the coils. Because such transistors are uni-directional, that is, only operate in one direction, current cannot be easily made to flow through the coils in the reverse direction.

Conventional DC motors of the brushless type have therefore phase-shifted the current supplied to the coils by 180° in order to provide reverse rotation of the rotor. That is, in the forward direction, current flows through the coils in one direction relative to the north and south magnet pole pieces and in the reverse direction, flows through the coils in the opposite direction in relation to such pole pieces.

In order to provide current energization of the coils, in position sensing device, such as a Hall-effect device, an optical detecting device or the like, is provided to detect the rotational position of the rotor with respect to the stator. The position sensing device produces a position signal which, in conjunction with a control signal corresponding to the desired rotational direction of the rotor, is used to alternately energize the stator coils for rotating the rotor with respect thereto. Such signals may, for example, be applied to a gate circuit comprised of a plurality of NAND gates and inverters which alternately activate the above-described unidirectional switching transistors associated with the coils in correspondence with the rotational position and desired rotational direction of the rotor. However, such gate circuit has proven to be disadvantageous as being too complex in design and operation.

OBJECTS AND SUMMARY OF THE INVENTION

Accordingly, it is an object of this invention to provide a reversible drive circuit for a brushless DC motor that avoids the above-described difficulties encountered with the prior art.

More particularly, it is an object of this invention to provide a simplified reversible drive circuit for a brushless DC motor of the type responsive to a control signal corresponding to a desired rotational direction of the rotor and to a position signal corresponding to the rotational position of the rotor for energizing the coils so as to rotate the rotor in either the forward or reverse direction.

Another object of this invention is to provide a reversible drive circuit for a brushless DC motor which is of relatively simple construction and operation.

In accordance with an aspect of this invention, in a brushless DC motor of the type having a rotor with at least one permanent magnet adapted to rotate about an axis and a stator including at least two coils, a reversible drive circuit is provided including first and second switching means for energizing two of the coils to rotate the rotor in either of the forward or reverse directions. The reversible drive circuit further includes means for generating a position signal corresponding to the rotational position of the rotor and means for producing a control signal corresponding to a desired rotational direction of the rotor. First switch control means is responsive to the control signal and the position signal for controlling the operation of the first and second switching means to rotate the rotor in one direction, for example, the forward direction, and second switch control means is responsive to the control signal, the position signal and an output of the first switch control means for controlling the operation of the first and second switching means to rotate the rotor in the opposite direction, that is, the reverse direction.

In a preferred embodiment of this invention, the first and second switch control means are comprised of first (NPN) and second (PNP) switch control transistors, respectively, which are connected in parallel and are alternately operative to rotate the rotor in the forward and reverse directions, respectively. That is, the emitter of the first switch control transistor and the collector of the second switch control transistor are connected in common to the first switching means and the collector of the first switch control transistor and the emitter of the second switch control transistor are connected in common to the second switching means with only one of the switch control transistors being operative at any given instant.

The above, and other, objects, features and advantages of the invention, will be apparent in the following detailed description of illustrative embodiments of the invention which is to be read in connection with the accompanying drawings.

BRIEF DESCRIPTION OF THE DRAWINGS

FIG. 3 is a graphical representation illustrating the combined rotational torque generated by the A-phase and B-phase coils of the DC motor of FIG. 1;

FIGS. 4A and 4B are waveform diagrams illustrating the relationship between the current signals for the A-phase and B-phase coils;

DETAILED DESCRIPTION OF THE PREFERRED EMBODIMENTS

Figures 1, 2:
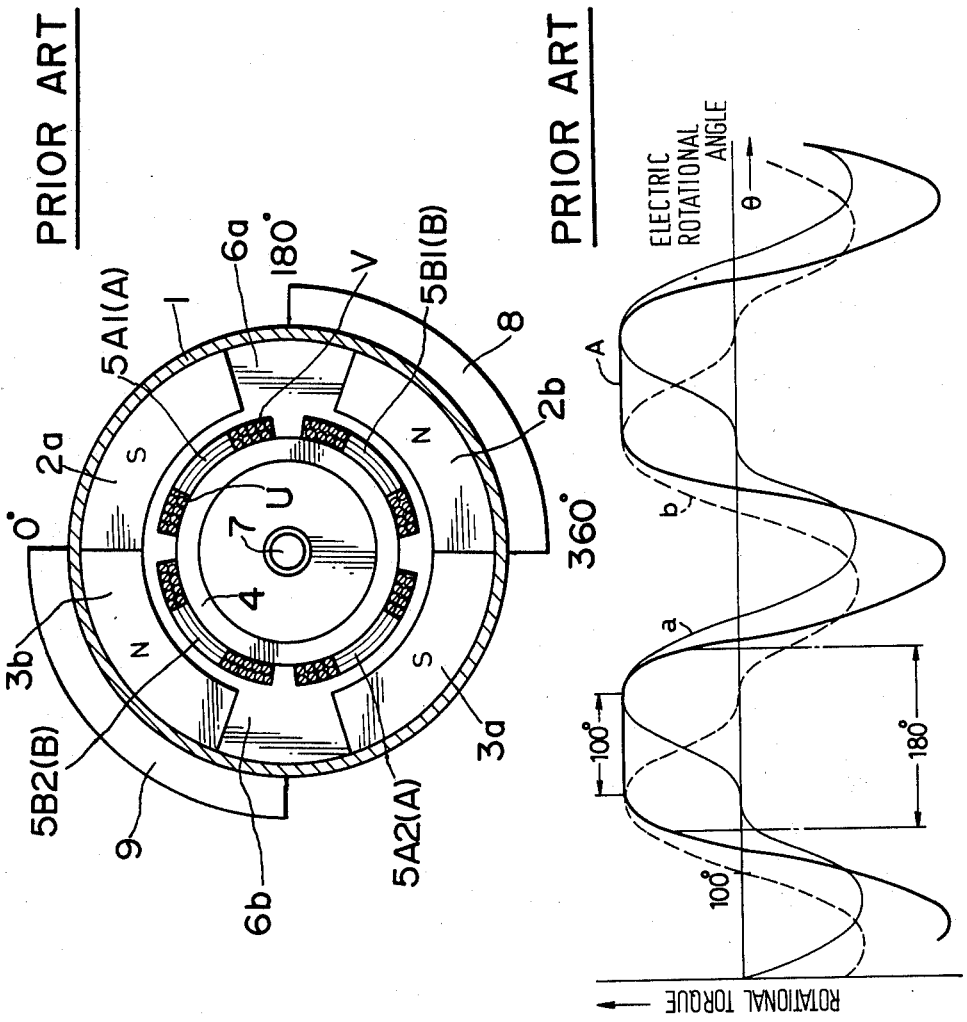
FIG. 1 is a cross-sectional view of a known 4-pole, 2-phase brushless DC motor with which this invention can be utilized.
FIG. 2 is a graphical representation illustrating the rotational torque generated by the A-phase coils of the DC motor of FIG. 1.

Referring to the drawings and initially to FIG. 1 thereof, there is shown a brushless DC motor with which the present invention finds ready application. The DC motor of FIG. 1 provides a rotational torque which is generated over 360 electrical degrees and is not reduced to zero at any point, thereby eliminating the necessity of providing auxiliary starting means for initiating motor rotation. Such motor is more fully described in U.S. Patent Application Ser. No. 894,487, filed Apr. 7, 1978, having a common assignee with the present application and the subject matter of which is incorporated herein by reference.

The DC motor of FIG. 1 is a 4-pole alternate phase brushless DC motor having a cylindrical outer rotor 1 fixed to a rotatable shaft 7. Secured to the inner circumferential surface of rotor 1 are two pairs of permanent magnet pole pieces constituted by a first pair of south and north magnet pole pieces 2a and 2b, respectively, and a second pair of south and north magnet pole pieces 3a and 3b, respectively, with each magnet pole piece 2a,2b,3a and 3b occupying an electrical angle of 140°. For the purpose of this and the following description, a "positional" angle is a geometrical angle between two points on the rotor or stator and an "electrical" angle is equal to the "positional" angle multiplied by the number of pairs of poles. Each pair of permanent magnet pole pieces occupies an electrical angle of 360° and the north and south pole pieces of each pair are separated by air gaps 6a and 6b, respectively, each occupying an electrical angle of 80°. It should thus be appreciated that the pairs of pole pieces are symmetric with respect to each other with the south magnet pole pieces 2a and 3a being in contact at an edge thereof with the north magnet pole pieces 3b and 2b, respectively, at rotational positions defined by electrical angles of 0° and 360°, respectively.

The DC motor further includes a non-rotatable stator 4 which is concentric with shaft 7. Symmetrically secured to an outer circumferential surface of stator 4 in facing relation to the pole pieces are two windings constituted by A-phase coils $5A_1$ and $5A_2$ and B-phase coils $5B_1$ and $5B_2$. The A-phase coils $5A_1$ and $5A_2$ are arranged in diametrically opposed relation on the outer circumferential surface of stator 4 so as to be spaced apart from each other by a positional angle of 180°. That is, the central portion of coil $5A_1$ is positioned 180° from the central portion of coil $5A_2$. Coils $5B_1$ and $5B_2$ are likewise diametrically arranged on stator 4 in the space between the A-phase coils. Further, A-phase coil $5A_1$ is connected in series with A-phase coil $5A_2$ and both coils are electrically in phase. B-phase coils $5B_1$ and $5B_2$ are also connected in series and are electrically in phase opposite to the phase of A-phase coils $5A_1$ and $5A_2$. Further, each of coils $5A_1, 5A_2, 5B_1$ and $5B_2$ includes first and second current paths V and U which are separated from each other by an electrical angle of 100°.

Referring now to FIG. 2, there is shown therein a graphical representation of the rotational torque generated by A-phase coils $5A_1$ and $5A_2$ in correspondence with the rotational position of rotor 1 is measured in electrical degrees. When current continuously flows through A-phase coils $5A_1$ and $5A_2$, the current flows in one direction through current path V and in the opposite direction through current path U of each A-phase coil. In this regard, curve a of FIG. 2 is representative of the magnetic flux linked by current path V of the A-phase coils and curve b is representative of the magnetic flux linked by current path U of the A-phase coils, wherein the linking magnetic flux is reduced to a minimum at air gaps 6a and 6b. The linked magnetic flux is, of course, proportional to the generated rotational torque. It should be appreciated, since current paths U and V of each coil are separated by an electrical angle of 100°, that curves a and b of FIG. 2 are likewise separated or out of phase by an electrical angle of 100°. If the two curves a and b are combined, a curve A (FIG. 2) is produced which is representative of the composite rotational torque produced by A-phase coils $5A_1$ and $5A_2$, such torque being generated over an electrical angle greater than 180°. In like manner, the composite rotational torque for B-phase coils $5B_1$ and $5B_2$ can be determined (FIG. 3). The combined effect of the A-phase coils and B-phase coils thereby produces a continuous rotational torque (FIG. 3) of substantially constant value with minimal ripple, as described more fully in the previously-mentioned commonly assigned application.

In order to obtain this continuous rotational torque characteristic, it is necessary that the signals supplied to the A-phase and B-phase coils be out of phase by 180°. In this regard, switching elements, such as switching transistors, are typically provided for supplying alternating energizing currents to the A-phase and B-phase coils. An alternating signal (waveform A in FIG. 4A) is thus supplied to the switching transistor for the A-phase coils to alternately turn the transistor ON and OFF in correspondence thereto, whereby the A-phase coils are alternately energized. At the same time, an alternating signal (waveform B in FIG. 4B), which is 180° out of phase with the signal shown as waveform A, is supplied to the transistor for the B-phase coils to alternately turn this transistor ON and OFF. Thus, during each successive period, the A and B waveforms alternate in phase so as to alternately turn the transistors associated with the A-phase and B-phase coils, respectively, ON and OFF out of phase with each other. This results in the A-phase and B-phase coils being alternately energized out of phase with each other. Further, when the signals represented by waveforms A and B are supplied to the switching transistors for the A-phase and B-phase coils, respectively, rotor 1 is caused to rotate in one direction and when such signals are reversely supplied to the switching transistors for the coils, rotor 1 is caused to rotate in the opposite direction.

Figure 5:
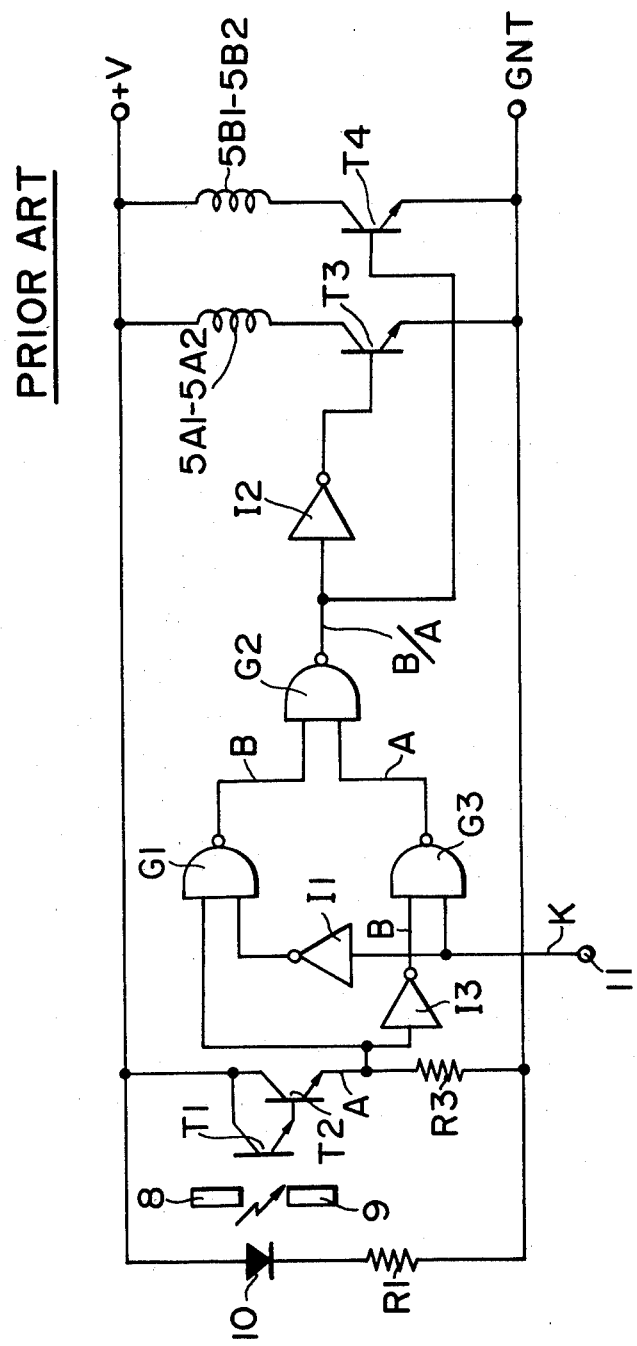
FIG. 5 is a circuit wiring-block diagram of a known reversible drive circuit for a brushless DC motor.

It should be appreciated that the signals of FIGS. 4A and 4B operate to energize the coils in correspondence with the rotational position of rotor 1. A position detecting device is therefore provided for producing such signals, hereinafter referred to as position signal A and inverted position signal B, in correspondence with the rotational position of rotor 1. One embodiment of such a device is shown in FIGS. 1 and 5 as an optical detecting device having shutter blades 8 and 9 symmetrically fixed to an outer circumferential portion of rotor 1. Each shutter blade occupies an electrical angle of 180° and is separated from the other shutter blade by the same electrical angle of 180°. Preferably, edges of the shutter blades 9 and 8 are respectively disposed at the previously-defined 0° and 360° electrical angle positions along rotor 1 (FIG. 1). The optical detecting device further includes a light emitting element, such as a light emitting diode 10 and a light detecting element, such as a phototransistor $T_1$ (FIG. 5) disposed on opposite sides of shutter blades 8 and 9. Diode 10 emits a continuous stream of light which is to be detected by phototransistor $T_1$ and shutter blades 8 and 9 selectively interrupt this emitted light to phototransistor $T_1$ in correspondence with the rotational position of rotor 1. As shown in FIG. 5, diode 10 is connected in series with a resistor $R_1$ between a voltage source $+V$ and ground whereby a continuous current flow activates diode 10. Phototransistor $T_1$ is connected in a Darlington configuration with a second transistor $T_2$, both transistors being NPN transistors with the collectors thereof commonly connected to voltage source $+V$, the emitter of transistor $T_1$ connected to the base of transistor $T_2$ and the emitter of transistor $T_2$ connected to ground through a resistor $R_3$. In this configuration, light from diode 10 which is not interrupted by shutter blades 8 and 9 is detected by transistor $T_1$, resulting in position signal A being produced at the emitter of transistor $T_2$.

It is to be realized, however, that other suitable devices may be utilized to produce position signal A. For example, a Hall-effect device may be provided for sensing the rotational position of rotor 1 and generating a position signal in response thereto. That is, a Hall-effect device may sense the intensity and polarity of the magnetic flux generated by north and south pole pieces $2a, 2b, 3a$ and $3b$, thereby producing a position signal as a function of such detected flux. As another example, a position sensing device may comprise a reflective portion and a non-reflective portion angularly separated from each other on the inner circumferential surface of rotor 1 with a light emitting element and a light sensing element appropriately positioned on stator 4 for detecting the rotational position of rotor 1 and producing a position signal in response thereto. As may be appreciated by those of ordinary skill in the art, other embodiments of the position sensing device, such as those using a variable reluctance element or a variable capacitance element, also can be used if desired. When any of the above position detecting devices are used, a position signal A (FIG. 4A) is generated at the emitter of transistor $T_2$ and used for energizing the A-phase and B-phase coils.

There is shown in FIG. 5 a known reversible drive circuit for energizing the coils in response to the position signal so as to rotate rotor 1 in the forward or reverse direction. The reversible drive circuit of FIG. 5 includes a two input NAND gate $G_1$ supplied with position signal A at one of its inputs and a two input NAND gate $G_3$ supplied at one of its inputs with inverted positioned signal B (FIG. 4B) derived from signal A by means of an inverter $I_3$. A control signal K corresponding to a desired rotational direction of rotor 1 is supplied to the other input of NAND gate $G_3$ and through an inverter $I_1$ to the other input of NAND gate $G_1$ from an input terminal 11. Control signal K is of a high or logic "1" level for the forward rotation of rotor 1 and of a low or logic "0" level for the reverse rotation of rotor 1. The outputs of NAND gates $G_1$ and $G_3$ are supplied to the respective inputs of a two input NAND gate $G_2$ which, in turn, produces an output signal for controlling the energization of the A-phase and B-phase coils. That is, the output signal from NAND gate $G_2$ is supplied through an inverter $I_2$ to the base of a switching transistor $T_3$ which controls the energization of the A-phase coils 5A1, 5A2 and is supplied directly to the base of a switching transistor $T_4$ which controls the energization of the B-phase coils 5B1, 5B2. Since transistor $T_3$ has its emitter-collector path connected in series with the A-phase coils between voltage source $+V$ and ground and transistor $T_4$ has its emitter-collector path connected in series with the B-phase coils between voltage source $+V$ and ground, the A-phase and B-phase coils are energized when switching transistors $T_3$ and $T_4$ are turned ON, respectively. It should be appreciated therefore that the output signal from NAND gate $G_2$, which is used to activate switching transistors $T_3$ and $T_4$, is dependent only on position signal A and control signal K.

Thus, for forward rotation of rotor 1, position signal A is supplied to one input of NAND gate $G_1$ and inverted position signal B is supplied to one input of NAND gate $G_3$. At the same time, a logic level "1" control signal is supplied to the other input of NAND gate $G_3$ and a logic level "0" control signal is supplied to the other input of NAND gate $G_1$. This means that the output of NAND gate $G_1$ is always at logic level "1" while NAND gate $G_3$ produces position signal A at its output. This results in position signal A controlling the operation of transistor $T_3$ and inverted position signal B controlling the operation of transistor $T_4$ whereby the A-phase coils and B-phase coils are alternately energized 180° out of phase with each other. Such alternate energization of the A-phase and B-phase coils results in a continuous torque acting on rotor 1, causing it to rotate in the forward direction.

During reverse rotation of rotor 1, control signal K is at logic level "0", resulting in position signal A being produced at the output of NAND gate $G_2$ and being supplied directly to transistor $T_4$ and through inverter $I_2$ to transistor $T_3$. As a result, switching transistors $T_3$ and $T_4$ are alternatively activated 180° out of phase with the activation thereof in the forward direction.

Figure 6:
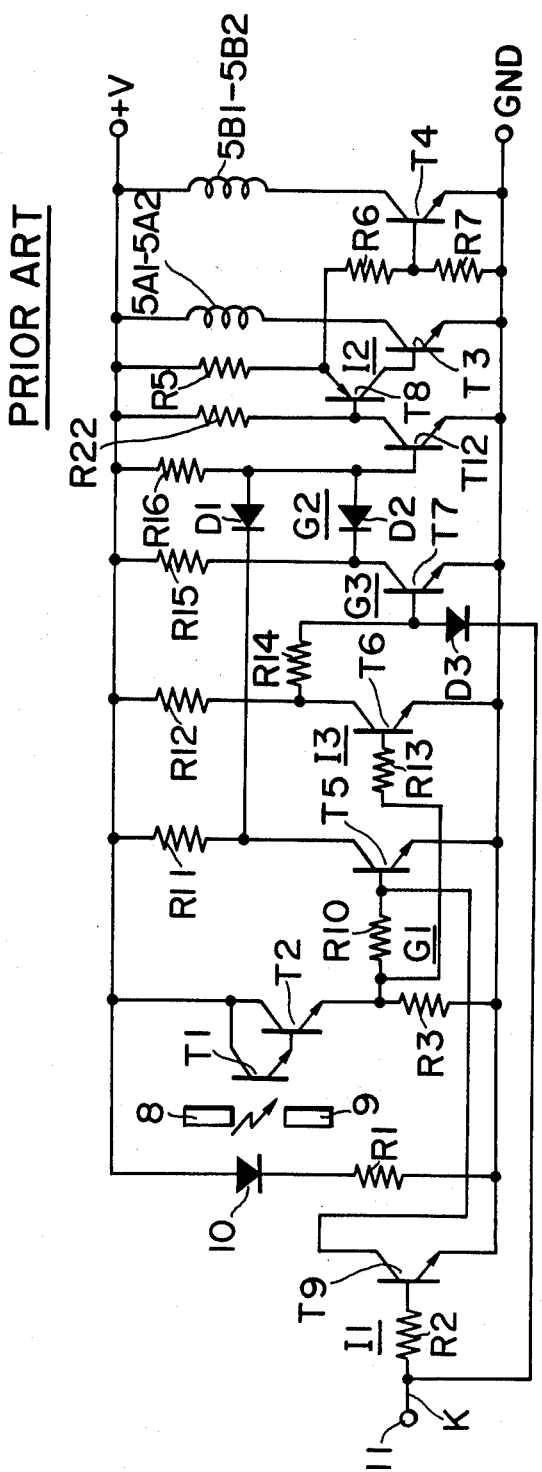
FIG. 6 is a detailed circuit wiring diagram of the circuit of FIG. 5.

Referring now to FIG. 6, there is shown a detailed circuit wiring diagram for the circuit of FIG. 5. As shown therein, inverter $I_1$ is constituted by an NPN transistor $T_9$ having its emitter-collector path connected between an input of NAND gate $G_1$ and ground and having control signal K supplied to its base through a resistor $R_2$. NAND gate $G_1$ is comprised of an NPN transistor $T_5$ having its collector connected to voltage source $+V$ through a resistor $R_{11}$ and its emitter connected to ground. The base of transistor $T_5$ is supplied with the inverted control signal from the collector of transistor $T_9$ and with position signal A through a resistor $R_{10}$.

Position signal A is further supplied to inverter $I_3$ comprised of an NPN transistor $T_6$ having its collector connected to voltage source $+V$ through a resistor $R_{12}$ and its emitter connected to ground. The base of transistor $T_6$ is thus supplied with position signal A through a resistor $R_{13}$. The output of transistor $T_6$ at its collector, that is, inverted position signal B, is supplied to the base of an NPN transistor $T_7$ of NAND gate $G_3$ through a resistor $R_{14}$. That is, position signal A is inverted by transistor $T_6$ and this inverted position signal B is supplied to transistor $T_7$. Further, control signal K is supplied to the cathode of a diode $D_3$, the anode of which is connected to the base of transistor $T_7$. This means that when control signal K is at logic level "1", diode $D_3$ is turned OFF and transistor $T_7$ is controlled solely by inverted position signal B and when control signal K is at logic level "0", diode $D_3$ is rendered operative to turn OFF transistor $T_7$. Further, the collector of transistor $T_7$ is connected to voltage source $+V$ through a resistor $R_{15}$ and its emitter is connected to ground. It should be realized that the signals produced at the collectors of transistors $T_5$ and $T_7$ represent the outputs of NAND gates $G_1$ and $G_3$, respectively.

NAND gate $G_2$ is constituted by two diodes $D_1$ and $D_2$ having the cathodes thereof connected to the collectors of transistors $T_5$ and $T_7$ of NAND gates $G_1$ and $G_3$, respectively. The anodes of diodes $D_1$ and $D_2$ are commonly connected to voltage source $+V$ through a resistor $R_{16}$ and to the base of an NPN transistor $T_{12}$ also included in NAND gate $G_2$. This means that when control signal K is at logic level "0", transistor $T_7$ is turned OFF thereby also rendering diode $D_2$ inoperative. Therefore, the signal supplied to the base of transistor $T_{12}$ is controlled by inverted position signal B produced at the collector of transistor $T_5$ of NAND gate $G_1$. In like manner, when control signal K is at logic level "1", transistor $T_5$ is rendered inoperative by the inverted control signal whereby the signal supplied to the base of transistor $T_{12}$ is determined by position signal A produced at the collector of transistor $T_7$ of NAND gate $G_3$. Transistor $T_{12}$ has its emitter connected to ground and its collector connected to voltage source $+V$ through a resistor $R_{22}$ and to the base of a PNP transistor $T_8$ of inverter $I_2$. The collector of transistor $T_8$ is connected to the base of switching transistor $T_3$ and supplies a signal thereto of identical phase to the signal supplied to its base. The emitter of transistor $T_8$ is connected to voltage source $+V$ through a resistor $R_5$ and to the base of switching transistor $T_4$ through a voltage divider network comprised of resistors $R_6$ and $R_7$ and supplies a signal to switching transistor $T_4$ which is inverted in phase from the signal supplied to its own base.

As should readily be appreciated, the circuit of FIG. 6 is of fairly complicated construction and operation. For example, in addition to the conventional position detecting device and switching transistors $T_3$ and $T_4$, six additional transistors and three additional diodes are used to construct the reversible drive circuit for the DC motor of FIG. 1. The present invention is designed to greatly simplify such construction and operation.

Figure 7A:
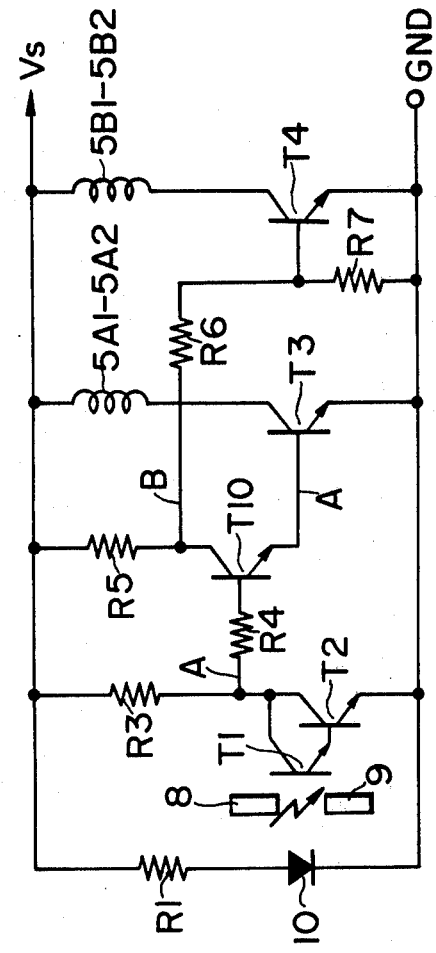
FIG. 7A is a circuit wiring diagram used for explaining the design and operation of the reversible drive circuit according to this invention for rotating the rotor in the forward rotational direction.
Figure 7B:
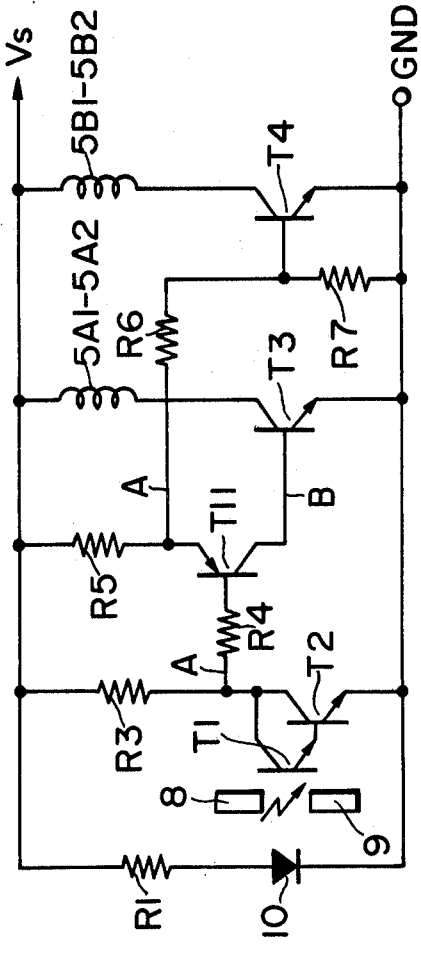
FIG. 7B is a circuit wiring diagram used for explaining the design and operation of the reversible drive circuit according to this invention for rotating the rotor in the reverse rotational direction.

Referring now to FIGS. 7A and 7B, forward and reverse drive circuits, respectively, for the brushless DC motor of FIG. 1 are shown in order to explain the basis of the present invention. Referring first to FIG. 7A, the forward drive circuit for the brushless DC motor of FIG. 1 includes a single NPN switch control transistor $T_{10}$, in addition to the transistors of the position detecting device and the switching transistors $T_3$ and $T_4$. Switch control transistor $T_{10}$ is supplied at its base with position signal A through a resistor $R_4$. Further, the emitter of transistor $T_{10}$ is connected to the base of switching transistor $T_3$ and the collector thereof is connected to a voltage source $+V_S$ through a resistor $R_5$ and to the base of switching transistor $T_4$ through resistor $R_6$ which constitutes a voltage divider network with resistor $R_7$, as previously discussed. The construction of switching transistors $T_3$ and $T_4$, A-phase and B-phase coils and the position detecting device are identical in all relevant aspects to the like referenced elements of the prior art circuit of FIG. 6. It should be noted, however, that position signal A is obtained at the collector of transistor $T_2$ in contrast to such signal being obtained from the emitter of transistor $T_2$ in FIG. 6. Either one of these configurations, however, may be utilized with the only difference being that shutter blades 8 and 9 of FIG. 7A should be displaced along the circumference of rotor 1 by an electrical angle of 180° from the position of shutter blades 8 and 9 of FIGS. 5 and 6. When position signal A is supplied to the base of switch control transistor $T_{10}$, transistors $T_3$ and $T_4$ are alternately turned ON and OFF in correspondence with position signal A produced at the emitter of transistor $T_{10}$ and inverted position signal B produced at the collector of transistor $T_{10}$, whereby switching transistors $T_3$ and $T_4$ act to alternately energize the A-phase and B-phase coils to rotate rotor 1 in the forward direction.

In comparison, FIG. 7B represents a reverse drive circuit for rotating motor 1 of FIG. 1 in the reverse direction. As shown therein, the reverse drive circuit includes a PNP switch control transistor $T_{11}$ having its collector connected to the base of switching transistor $T_3$ and its emitter connected to a voltage source $V_S$ through resistor $R_5$ and to the base of transistor $T_4$ through resistor $R_6$, as previously described. The base of transistor $T_{11}$ is supplied with position signal A through resistor $R_4$ whereby position signal A energizes the B-phase coils through switching transistor $T_4$ and inverted position signal B energizes the A-phase coils through switching transistor $T_3$. It should readily be appreciated that the signals supplied to switching transistors $T_3$ and $T_4$ are 180° out of phase with the signals supplied thereto in the forward drive circuit of FIG. 7A. This results in switching transistors $T_3$ and $T_4$ being alternately turned ON and OFF in opposition to the operation of these transistors in the forward drive circuit of FIG. 7A. Again, however, in addition to switching transistors $T_3$ and $T_4$ and the transistors of the position detecting device, only one additional transistor is necessary to constitute the reverse drive circuit.

As previously discussed, the rotational torque for the brushless DC motor of FIG. 1 is substantially constant with minimal ripple and does not equal zero at any point. Further, the rotational torque curves for the forward and reverse directions are the same so that the forward and reverse drive circuits of FIGS. 7A and 7B, respectively, can be combined in a single circuit arrangement using many of the same elements.

Figure 8:
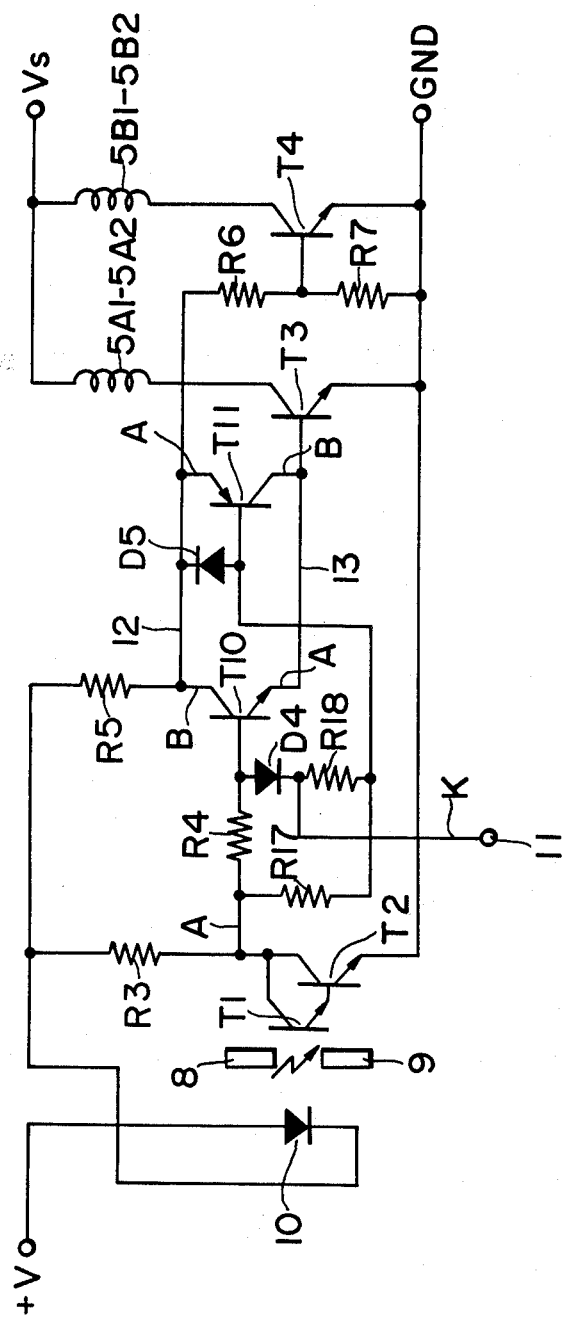
FIG. 8 is a circuit wiring diagram of a reversible drive circuit according to one embodiment of this invention.

Referring now to FIG. 8, one embodiment of a reversible drive circuit according to this invention for a brushless DC motor will now be described, with elements corresponding to those described above with reference to the prior art reversible drive circuit of FIGS. 5 and 6 and the explanatory circuits of FIGS. 7A and 7B being identified by the same reference numerals. The position detecting device comprised of diode 10, shutter blades 8 and 9 and the Darlington transistor pair of transistors $T_1$ and $T_2$ operate in the same manner as the position detecting device of FIGS. 6, 7A and 7B with shutter blades 8 and 9 being positioned along the outer circumferential surface of rotor 1 in an identical manner with respect to the shutter blades shown in the embodiment of FIGS. 7A and 7B. Further, the construction and operation of switching transistors $T_3$ and $T_4$, voltage divider $R_6$ and $R_7$ and the A-phase and B-phase coils are identical to the same elements in FIGS. 6, 7A and 7B.

The reversible drive circuit shown in FIG. 8 is comprised of NPN switch control transistor $T_{10}$ and PNP switch control transistor $T_{11}$ connected in parallel with each other. More particularly, the collector of switch control transistor $T_{10}$ and the emitter of switch control transistor $T_{11}$ are connected in common by a signal line 12 to voltage source $+V$ through resistor $R_5$ and diode 10 and to the base of transistor $T_4$ through the voltage divider network comprised of resistors $R_6$ and $R_7$. Further, the emitter of switch control transistor $T_{10}$ and the collector of switch control transistor $T_{11}$ are connected in common by a signal line 13 to the base of switching transistor $T_3$. Position signal A is supplied to the base of switch control transistor $T_{10}$ through resistor $R_4$ and to the base of switch control transistor $T_{11}$ through a resistor $R_{17}$, thereby rendering these transistors responsive to position signal A which corresponds to the rotational position of rotor 1.

Switch control transistors $T_{10}$ and $T_{11}$ are further responsive to control switch K which is at logic level "1" for forward rotation of rotor 1 and at logic level "0" for reverse rotation of rotor 1. Control signal K is supplied through a resistor $R_{18}$ to the base of switch control transistor $T_{11}$ and to the base of switch control transistor $T_{10}$ through a diode $D_4$ having its cathode connected to input terminal 11 and its anode connected to the base of transistor $T_{10}$.

When control signal K has a value of logic level "1", diode $D_4$ is rendered inoperative and switch control transistor $T_{10}$ is alternately turned ON and OFF in response to position signal A supplied to its base. This results in inverted position signal B being produced at the collector of switch control transistor $T_{10}$ and position signal A being produced at the emitter of transistor $T_{10}$ for alternately rendering operative switching transistors $T_4$ and $T_3$, respectively, for controlling the A-phase and B-phase coils. As a result, the A-phase coils $5A_1$ and $5A_2$ and B-phase coils $5B_1$ and $5B_2$ are alternately energized 180° out of phase to rotate rotor 1 in the forward direction. It should be appreciated that when control signal K is at logic level "1", transistor $T_{11}$ is always rendered inoperative. That is, since control signal K must be of a value greater than the voltage produced by voltage source $+V$ in order to turn OFF diode $D_4$, control signal K supplied to the base of switch control transistor $T_{11}$ is always greater than the signal produced at the emitter thereof to maintain switch control transistor $T_{11}$ in its inoperative mode.

In comparison, for reverse rotation of rotor 1, switch control transistor $T_{10}$ is always turned OFF and switch control transistor $T_{11}$ is used to control the switching operation of switching transistors $T_3$ and $T_4$. More particularly, when control signal K is at logic level "0" during the reverse mode, diode $D_4$ is rendered operative whereby such logic level "0" signal is supplied to the base of switch control transistor $T_{10}$ to turn it OFF. This results in a voltage $+V$ being produced at the collector of switch control transistor $T_{10}$. Since the logic level "0" signal is also supplied through resistor $R_{18}$ to the base of transistor $T_{11}$ and the voltage $+V$ from the collector of transistor $T_{10}$ is supplied to the emitter of switch control transistor $T_{11}$ through signal line 12, switch control transistor $T_{11}$ is alternately turned ON and OFF by position signal A. Thus, the signal now supplied to switching transistor $T_4$ is position signal A while the signal supplied to switching transistor $T_3$ is inverted position signal B, these signals being 180° out of phase with the signals supplied to the respective transistors from switch control transistor $T_{10}$ during the forward rotation of rotor 1. Accordingly, A-phase coils $5A_1$ and $5A_2$ and B-phase coils $5B_1$ and $5B_2$ are alternately energized 180° out of phase to rotate rotor 1 in the reverse direction.

It is preferable, however, to use the reverse drive circuit of FIG. 8 as a brake for the forward rotation of rotor 1. That is, when the logic level "1" control signal K is removed, rotational inertia keeps rotor 1 spinning in the forward direction until friction causes the rotor to stop. Therefore, to quickly stop such forward rotation of rotor 1, a logic level "0" control signal K is supplied to the reversible drive circuit, as previously discussed, for producing an opposing rotational torque on rotor 1. Since rotor 1 is rotating in the forward direction, the reverse torque created by the operation of switch control transistor $T_{11}$ acts to oppose such forward rotation and brake rotor 1. Of course, it is to be realized that the logic level "0" control signal K should only be applied for a short time interval in order to prevent rotor 1 from beginning rotation in the reverse direction.

In each of the above-described modes of operation, a speed servo control voltage $V_S$ is supplied to A-phase coils $5A_1$ and $5A_2$ and B-phase coils $5B_1$ and $5B_2$ to control the rotational speed of rotor 1. Further, a diode $D_5$ is connected between the base and emitter of switch control transistor $T_{11}$ for protecting the transistor when its base is reversely biased.

Figure 9:
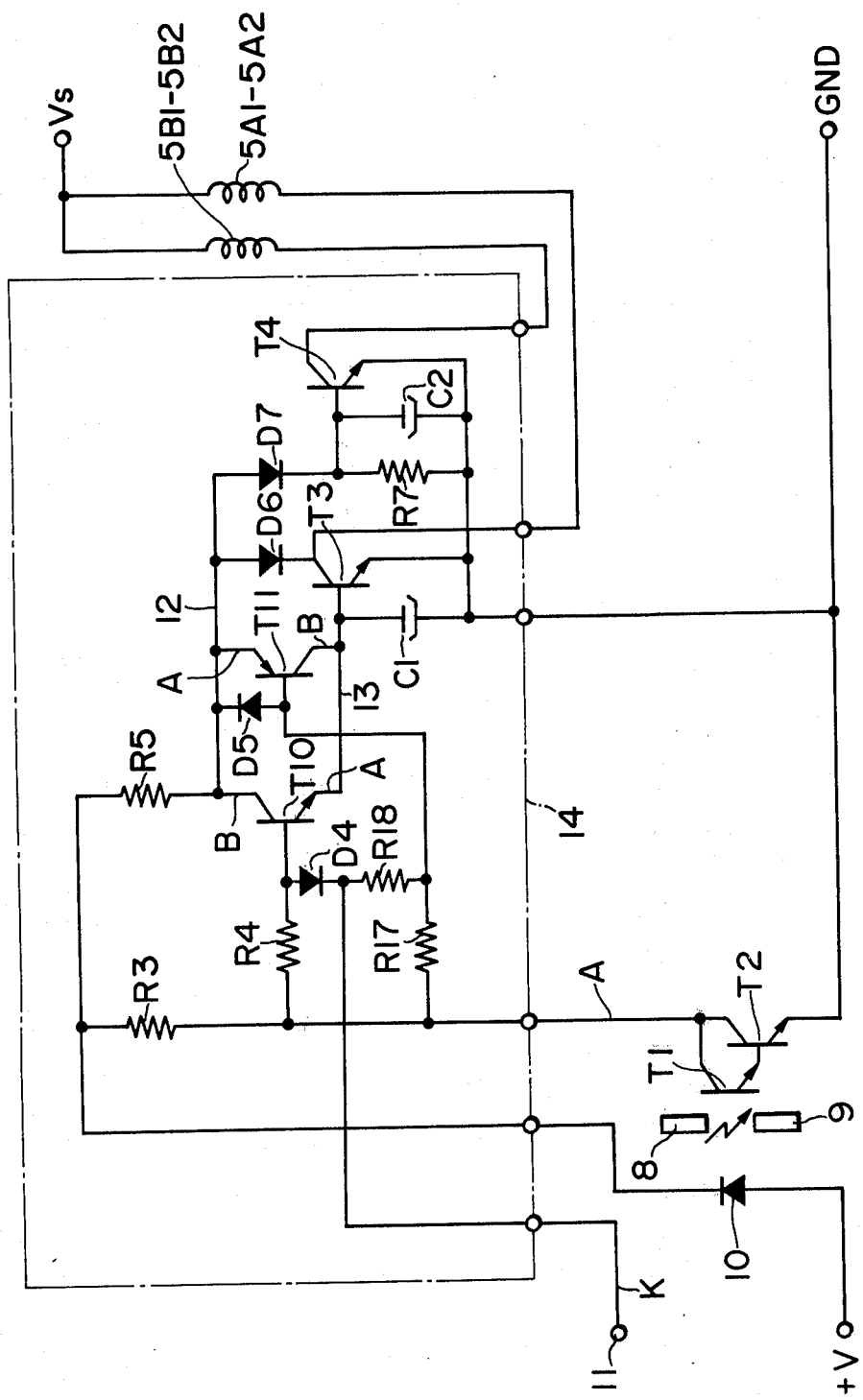
FIG. 9 is a circuit wiring diagram of a reversible drive circuit according to another embodiment of this invention.

Referring now to FIG. 9, it will be seen that, in another embodiment of the reversible drive circuit according to this invention, elements corresponding to those described above with reference to the circuit of FIG. 8 are identified by the same reference numerals. The reversible drive circuit of FIG. 9, with the exception of the position detecting device and the A-phase and B-phase coils, may be produced in the configuration of an integrated circuit 14. The reversible drive circuit of FIG. 9 is substantially identical to the circuit of FIG. 8 with the following exceptions and additions. A diode $D_7$ is substituted for resistor $R_6$ of the voltage divider network $R_6$ and $R_7$ at the base of switching transistor $T_4$. Diode $D_7$ functions as a level shifting element to ensure that switching transistor $T_4$ is rendered inoperative when switching transistor $T_3$ is operative. For example, during forward rotation of rotor 1, when position signal A is at its high level to turn ON switch control transistor $T_{10}$, the potential at the collector of switch control transistor $T_{10}$ is equal to $V_{CE(sat)} + V_{BE}$ from transistors $T_{10}$ and $T_3$, respectively. Although this potential may be sufficient to turn ON diode $D_7$, a voltage drop occurs across diode $D_7$ and, in conjunction with the reduced voltage from the voltage divider network of diode $D_7$ and resistor $R_7$, the signal produced at the base of switching transistor $T_4$ is insufficient to turn this transistor ON. It should be realized, however, that the voltage divider network of resistors $R_6$ and $R_7$ may be used to perform the same function by appropriately selecting the resistance values of such resistors to provide a signal having a level insufficient to turn ON switching transistor $T_4$.

In some instances, however, the collector-emitter saturation voltage $V_{CE(sat)}$ of switch control transistor $T_{10}$ and the base-emitter voltage $V_{BE}$ of switching transistor $T_3$ may vary from their specified or regulated values due to, for example, poor quality of the transistors or fluctuation in voltage source $+V$. In such case, the potential at the collector of switch control transistor $T_{10}$ may be higher than a predetermined value based on the specifications of the transistors. As a result, diode $D_7$ may be turned ON to such an extent so as to also turn ON switching transistor $T_4$. Thus, with switching transistors $T_3$ and $T_4$ both turned ON, rotor 1 will not rotate. To avoid this result, a clamping diode $D_6$ is connected between the collector of switching transistor $T_3$ and the anode of diode $D_7$. When transistors $T_{10}$ and $T_3$ are turned ON, the potential of line 12 at the input of diode $D_7$ is therefore clamped to the collector voltage of transistor $T_3$ to ensure that switching transistor $T_4$ is turned OFF when switching transistor $T_3$ is turned ON.

Further, capacitors $C_1$ and $C_2$ are connected between the bases of switching transistors $T_3$ and $T_4$, respectively, and ground for dulling the leading and trailing edges of the signals supplied to the bases. In other words, capacitors $C_1$ and $C_2$ function to prevent the switching transistors from erroneously turning ON due to any high frequency components and mechanical and electrical noise from the DC motor which may be included in the signals supplied to the bases thereof. It is to be realized, however, that although capacitors $C_1$ and $C_2$ are shown to be connected between the bases of switching transistors $T_3$ and $T_4$, respectively, and ground, these capacitors may be connected between the collectors of the switching transistors and ground. However, when connected between the bases of the transistors and ground, capacitors having smaller capacitance values can be used.

Figure 10:
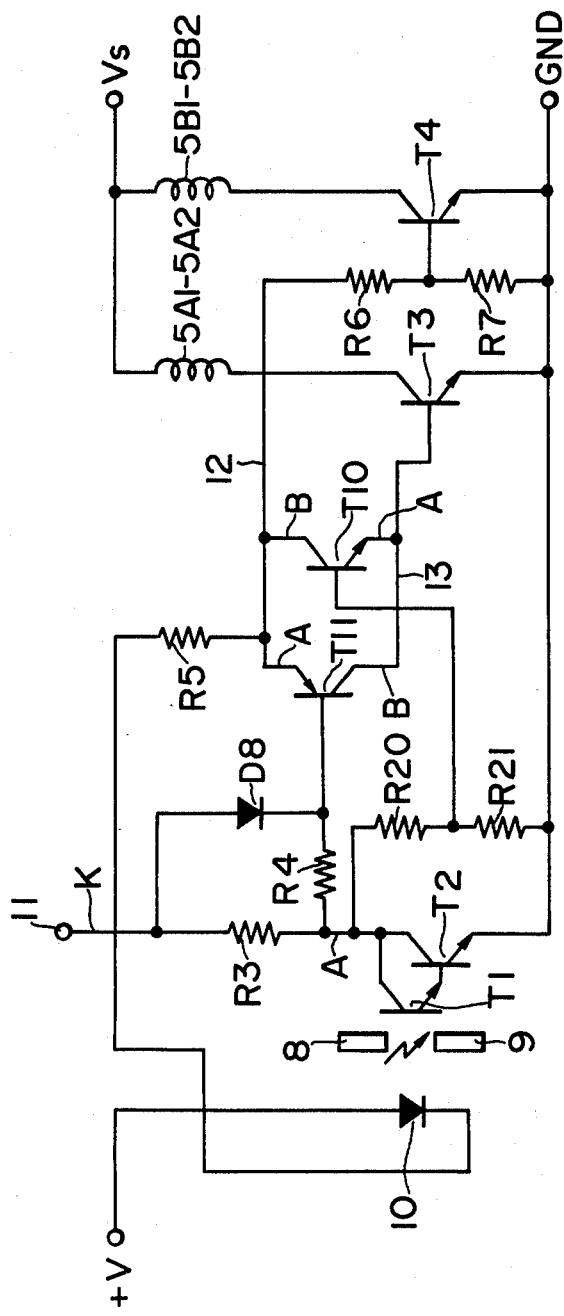
FIG. 10 is a circuit wiring diagram of a reversible drive circuit according to still another embodiment of this invention.

Referring now to FIG. 10, it will be seen that, in another embodiment of the reversible drive circuit according to this invention, elements corresponding to those described above with reference to the circuit of FIG. 8 are represented by like numerals. FIG. 10 represents a modification of the circuit of FIG. 8 in which diode $D_4$ and resistor $R_{18}$ are eliminated. In this embodiment, position signal A is supplied to the base of switching transistor $T_{10}$ through a voltage divider network comprised of resistors $R_{20}$ and $R_{21}$ and to the base of switch control transistor $T_{11}$ through resistor $R_4$. Control signal K from input terminal 11 is supplied to the base of switch control transistor $T_{10}$ through a resistor $R_3$ and the voltage divider network $R_{20}$ and $R_{21}$. Thus, when control signal K is at logic level "1", position signal A at the collector of transistor $T_2$ alternately turns switch control transistor $T_{10}$ ON and OFF to control the energization of the A-phase and B-phase coils. In addition, the reversible drive circuit of FIG. 10 includes a diode $D_8$ connected between input terminal 11 and the base of switch control transistor $T_{11}$ so that when control signal K is at logic level "1", this signal is supplied through diode $D_8$ to the base of switch control transistor $T_{11}$ to turn this transistor OFF, thereby bypassing the switching arrangement resulting from position signal A. However, when control signal K is at logic level "0", diode $D_8$ is turned OFF, resulting in switch control transistor $T_{11}$ being alternately turned ON and OFF in correspondence with position signal A. At this time, switch control transistor $T_{10}$ is turned OFF by control signal K to ensure the operation of switch control transistor $T_{11}$, as previously discussed in relation to the circuit of FIG. 8. In this manner, switch control transistors $T_{10}$ and $T_{11}$ are alternately turned ON and OFF in the same manner as previously described in relation to FIG. 8 to alternately energize the A-phase and B-phase coils.

Figure 11:
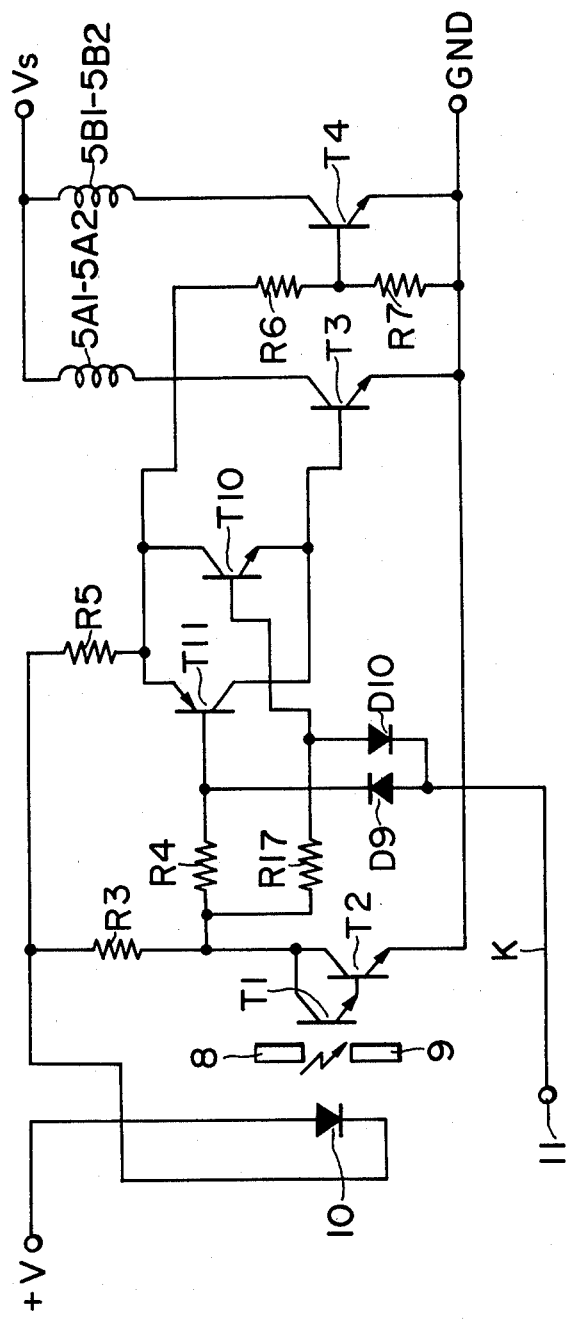
FIG. 11 is a circuit wiring diagram of a reversible drive circuit according to yet another embodiment of this invention.

Referring now to FIG. 11, there is shown still another modification of the reversible drive circuit of FIG. 8 in which like reference numerals represent like parts. In this circuit, diodes $D_9$ and $D_{10}$ are connected in opposing relation between the bases of switch control transistors $T_{11}$ and $T_{10}$, respectively, and input terminal 11. That is, diode $D_9$ has its cathode connected to the base of transistors $T_{11}$ and its anode connected to input terminal 11 and diode $D_{10}$ has its anode connected to the base of transistor $T_{10}$ and its cathode connected to input terminal 11. Diode $D_{10}$ operates in an identical manner to diode $D_4$ of FIG. 8. That is, when control signal K is at logic level "1" diode $D_{10}$ is turned OFF so that the operation of switch control transistor $T_{10}$ is controlled by position signal A through resistor $R_{17}$ to alternately turn the transistor ON and OFF. When control signal K is at logic level "0", diode $D_{10}$ is rendered operative to turn OFF switch control transistor $T_{10}$. Further, diode $D_9$ operates in a manner similar to that of diode $D_8$ of FIG. 10. That is, when control signal K is at logic level "1", diode $D_9$ is rendered conductive to turn OFF switch control transistor $T_{11}$. However, when control signal K is at logic level "0", diode $D_9$ is turned OFF resulting in position signal A being supplied to the base of transistor $T_{11}$ through resistor $R_4$ to alternately turn this transistor ON and OFF for alternately energizing the coils to rotate rotor 1 in the reverse direction.

Figure 12:
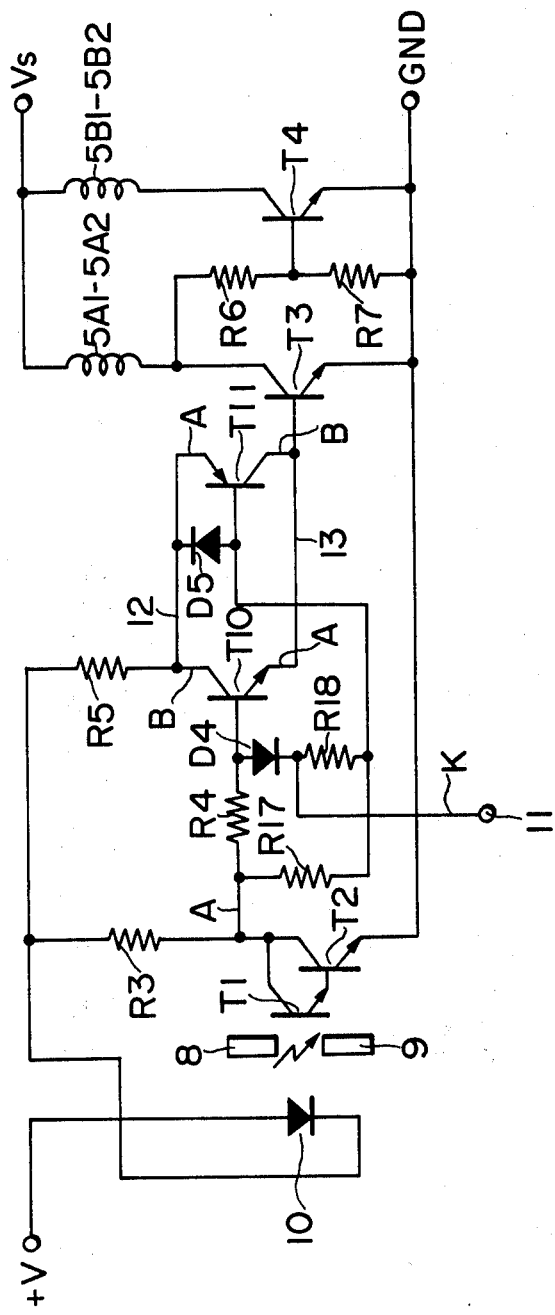
FIG. 12 is a circuit wiring diagram of a reversible drive circuit according to a further embodiment of this invention.

Referring now to FIG. 12, there is shown yet another modification of the reversible drive circuit of FIG. 8 in which elements corresponding to those described above with reference to the circuit of FIG. 8 are identified by the same reference numerals. In the reversible drive circuit of FIG. 12, the operation of switching transistor $T_4$ is controlled by the operation of switching transistor $T_3$ rather than switch control transistors $T_{10}$ and $T_{11}$ in the forward and reverse directions, respectively. Thus, the collector of switching transistor $T_3$ is connected to the base of switching transistor $T_4$ through voltage divider network $R_6$ and $R_7$. This means that when transistor $T_3$ is turned ON, the collector thereof is grounded through the collector-emitter path of the transistor to supply a logic level "0" signal to transistor $T_4$ to render it inoperative. When switching transistor $T_3$ is turned OFF, base current flows through the A-phase coils $5A_1$ and $5A_2$ and the voltage divider network $R_6$ and $R_7$ from voltage source $V_S$ to turn ON switching transistor $T_4$. Switching transistor $T_3$ is controlled by switch control transistors $T_{10}$ and $T_{11}$ in the forward and reverse directions, respectively, as previously discussed.

It is to be appreciated that, although only a 2-phase brushless DC motor has been shown in all of the above described embodiments of the invention, the present invention may be applied to other brushless DC motors, such as a 4-phase DC motor. Such 4-phase motor would further include C-phase and D-phase coils and drive circuits therefor, in addition to the A-phase and B-phase coils.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a reversible drive circuit for a DC motor of the type having a rotor adapted to rotate about an axis, a stator, at least two coils included in one of said stator and said rotor, and flux generating means included in the other of said stator and rotor, said reversible drive circuit comprising:

first switching means for energizing one of said coils;
second switching means for energizing another of said coils;
means for generating a position signal corresponding to the rotational position of said rotor;
means for producing a control signal corresponding to a desired rotational direction of said rotor;
first switch control means including a first switch control transistor responsive to said control signal and said position signal for controlling the operation of said first and second switching means so as to rotate said rotor in one direction; and
second switch control means including a second switch control transistor responsive to said control signal, said position signal and an output of said first switch control means for controlling the operation of said first and second switching means so as to rotate said rotor in the opposite direction, said second switch control transistor being connected in parallel with said first switch control transistor, wherein said first and second switch control transistors are alternately operative to rotate said rotor in said one direction and said opposite direction, respectively, and wherein current flows through each of said at least two coils in only one direction, regardless of the direction of rotation of said rotor.

2. A reversible drive circuit according to claim 1; in which said DC motor is of the brushless type with said stator including said at least two coils and said flux generating means having at least one permanent magnet included in the rotor.

3. A reversible drive circuit according to claim 2; in which said stator includes first and second coils and said first and second switching means includes first and second switching transistors, respectively, for supplying an energizing current to said first and second coils, respectively.

4. A reversible drive circuit according to claim 2; in which said means for generating a position signal includes optical detecting means comprised of a light emitting element for emitting light and a light detecting element for detecting said emitted light and producing an output signal in response to said detection, and shutter means for interrupting said light to said light detecting element in correspondence to the rotational position of said rotor.

5. A reversible drive circuit according to claim 4; in which said light emitting element includes a light emitting diode, said light detecting element includes a phototransistor and another transistor connected in a Darlington configuration, and said shutter means includes at least one shutter blade mounted on said rotor along an outer circumferential portion thereof so as to be positioned between said light emitting diode and said phototransistor.

6. A reversible drive circuit according to claim 1; in which said first and second switch control transistors have first and second bases, respectively and further comprising a diode having a cathode and an anode connected between said bases.

7. A reversible drive circuit according to claim 1; further including a diode connected between said means for producing a control signal and an input of said second switch control transistor for rendering said second switch control transistor inoperative when said control signal corresponds to said one rotational direction of said rotor.

8. A reversible drive circuit according to claim 1; in which said first and second switch control transistors include first and second inputs, respectively; and further comprising first and second diodes connected in opposing relation between said means for producing a control signal and said first and second inputs, respectively, for alternately rendering operative said first and second switch control transistors.

9. A reversible drive circuit according to claim 2; in which said first and second switching means include first and second switching transistors, respectively, for energizing said one and another of said coils, respectively, and an output of said first switching transistor is supplied to an input of said second switching transistor for controlling the operation thereof.

10. A reversible drive circuit according to claim 2; in which said DC motor includes first and second windings secured along an outer circumferential portion of said stator, each said winding including first and second coils connected in series with each other and separated from each other by an electrical angle of 360°, and said flux generating means includes two pairs of magnet poles of opposite polarity disposed along an inner circumferential portion of said rotor in facing relation to said first and second windings, each of said pairs of magnetic poles occupying an electrical angle of 360°.

11. In a reversible drive circuit for a brushless DC motor of the type including a stator having at least two coils and a rotor adapted to rotate about an axis and having flux generating means with at least one permanent magnet, said reversible drive circuit comprising:

first switching means for energizing one of said coils;
second switching means for energizing another of said coils;
means for generating a position signal corresponding to the rotational position of said rotor;
means for producing a control signal corresponding to a desired rotational direction of said rotor;
first switch control means responsive to said control signal and said position signal for controlling the operation of said first and second switching means so as to rotate said rotor in one direction, said first switch control means including an NPN switching transistor having a base, emitter and collector; and second switch control means responsive to said control signal, said position signal and an output of said first switch control means for controlling the operation of said first and second switching means so as to rotate said rotor in the opposite direction, said second switch control means including a PNP switching transistor connected in parallel with said NPN switching transistor and having a base, emitter and collector, wherein said emitter and collector of said NPN transistor are connected to said collector and emitter of said PNP transistor, respectively, and the bases of said transistors are connected to said means for generating a position signal and said means for producing a control signal so that said NPN and PNP transistors are alternately operative to rotate said rotor in said one direction and said opposite direction, respectively.

12. A reversible drive circuit according to claim 11; in which the emitter of said NPN transistor and the collector of said PNP transistor are connected in common to one of said first and second switching means and the collector of said NPN transistor and the emitter of said PNP transistor are connected in common to the other of said first and second switching means.

13. In a reversible drive circuit for a brushless DC motor of the type including a stator having at least two coils and a rotor adapted to rotate about an axis and having flux generating means with at least one permanent magnet, said reversible drive circuit comprising:
first switching means for energizing one of said coils;
second switching means for energizing another of said coils;
means for generating a position signal corresponding to the rotational position of said rotor;
means for producing a control signal corresponding to a desired rotational direction of said rotor;
first switch control means responsive to said control signal and said position signal for controlling the operation of said first and second switching means so as to rotate said rotor in one direction, said first switch control means including a first switch control transistor having a first base;
second switch control means responsive to said control signal, said position signal and an output of said first switch control means for controlling the operation of said first and second switching means so as to rotate said rotor in the opposite direction, said second switch control means including a second switch control transistor having a second base and connected in parallel with said first switch control transistor, said first and second switch control transistors being alternately operative to rotate said rotor in said one direction and said opposite direction, respectively; and
a diode having a cathode and an anode and connected between said first and second bases, and a resistor connected to the cathode of said diode and in series with said diode between the bases of said transistor, wherein said control signal is supplied to the cathode of said diode to render said diode inoperative when said control signal is of a high level and to render said diode operative when said control signal if of a low level.

14. A reversible drive circuit according to claim 13; in which said first switch control transistor is an NPN transistor with said first base thereof connected to the anode of said diode and also supplied with said position signal, and said second switch control transistor is a PNP transistor with said second base thereof connected to the cathode of said diode through said resistor and also supplied with said position signal, whereby said PNP transistor is rendered inoperative and said NPN transistor is rendered operative for rotating said rotor in said one direction when said control signal is of a high value and said NPN transistor is rendered inoperative and said PNP transistor is rendered operative for rotating said rotor in said opposite direction when said control signal if of a low value.

15. A reversible drive circuit according to claim 14; in which said position signal alternates between a high and low value in correspondence with predetermined rotational positions of said rotor so as to alternately render said NPN transistor operative when said control signal is of a high value and to alternately render said PNP transistor operative when said control signal is of a low value.

16. A reversible drive circuit according to claim 14; further including a diode connected between the emitter and base of said PNP transistor for protecting said PNP transistor when the base thereof is reversely biased.

17. In a reversible drive circuit for a brushless DC motor of the type including a stator having at least two coils and a rotor adapted to rotate about an axis and having flux generating means with at least one permanent magnet, said reversible drive circuit comprising:
first switching means for energizing one of said coils and including a first switching transistor;
second switching means for energizing another of said coils and including a second switching transistor;
means for generating a position signal corresponding to the rotational position of said rotor;
means for producing a control signal corresponding to a desired rotational direction of said rotor;
first switch control means responsive to said control signal and said position signal for controlling the operation of said first and second switching means so as to rotate said rotor in one direction and including a first switch control transistor;
second switch control means responsive to said control signal, said position signal and an output of said first switch control means for controlling the operation of said first and second switching means so as to rotate said rotor in the opposite direction, and including a second switch control transistor connected in parallel with said first switch control transistor, said first and second switching transistors being alternately operative by one of said first and second switch control transistors for energizing said one and another of said coils so as to rotate said rotor in one of said one direction and said opposite direction, respectively; and
a diode connected between an output of said first and second switch control transistors and an input of said second switching transistor for providing a voltage drop across said diode to ensure that said second switching transistor is inoperative when said first switching transistor is operative.

18. In a reversible drive circuit for a brushless DC motor of the type including a stator having at least two coils and a rotor adapted to rotate about an axis and having flux generating means with at least one permanent magnet, said reversible drive circuit comprising:

first switching means for energizing one of said coils and including a first switching transistor;

second switching means for energizing another of said coils and including a second switching transistor;

means for generating a position signal corresponding to the rotational position of said rotor;

means for producing a control signal corresponding to a desired rotational direction of said rotor;

first switch control means responsive to said control signal and said position signal for controlling the operation of said first and second switching means so as to rotate said rotor in one direction and including a first switch control transistor;

second switch control means responsive to said control signal, said position signal and an output of said first switch control means for controlling the operation of said first and second switching means so as to rotate said rotor in the opposite direction and including a second switch control transistor connected in parallel with said first switch control transistor, said first and second switching transistors being alternately operative by one of said first and second switch control transistors for energizing said one and another of said coils so as to rotate said rotor in one of said one direction and said opposite direction, respectively; and a clamping diode connected between an output of said first switching transistor and an input of said second switching transistor for ensuring that said second switching transistor is inoperative when said first switching transistor is operative.

19. In a reversible drive circuit for a brushless DC motor of the type including a stator having at least two coils and a rotor adapted to rotate about an axis and having flux generating means with at least one permanent magnet, said reversible drive circuit comprising:

first switching means for energizing one of said coils and including a first switching transistor having a base;

second switching means for energizing another of said coils and including a second switching transistor having a base;

means for generating a position signal corresponding to the rotational position of said rotor;

means for producing a control signal corresponding to a desired rotational direction of said rotor;

first switch control means responsive to said control signal and said position signal for controlling the operation of said first and second switching means so as to rotate said rotor in one direction, and including a first switch control transistor;

second switch control means responsive to said control signal, said position signal and an output of said first switch control means for controlling the operation of said first and second switching means so as to rotate said rotor in the opposite direction and including a second switch control transistor connected in parallel with said first switch control transistor, said first and second switching transistors being alternately operative by one of said first and second switch control transistors for energizing said one and another of said coils so as to rotate said rotor in one of said one direction and said opposite direction, respectively; and first and second capacitive elements connected between a reference potential and the bases of said first and second switching transistors, respectively, for attenuating high frequency components of respective signals supplied to said first and second switching transistors.

20. In a reversible drive circuit for a brushless DC motor of the type including a stator having at least two coils and a rotor adapted to rotate about an axis and having flux generating means with at least one permanent magnet, said reversible drive circuit comprising:

first switching means for energizing one of said coils;

second switching means for energizing another of said coils;

means for generating a position signal corresponding to the rotational position of said rotor;

means for producing a control signal corresponding to a desired rotational direction of said rotor;

first switch control means responsive to said control signal and said position signal for controlling the operation of said first and second switching means so as to rotate said rotor in one direction, said first switch control means including a first switch control transistor having a first input;

second switch control means responsive to said control signal, said position signal and an output of said first switch control means for controlling the operation of said first and second switching means so as to rotate said rotor in the opposite direction, said second switch control means including a second switch control transistor having a second input and connected in parallel with said first switch control transistor, said first and second switch control transistors being alternately operative to rotate said rotor in said one direction and said opposite direction, respectively; and first and second diodes connected in opposing relation between said means for producing a control signal and said first and second inputs, respectively, for alternately rendering operative said first and second switch control transistors, each of said first and second diodes including a cathode and an anode, the cathode of said first diode and the anode of said second diode being connected to said means for producing a control signal, and the anode of said first diode and the cathode of said second diode being connected to an input of said first and second switch control transistors, whereby said first switch control transistor is rendered operative and said second switch control transistor is rendered inoperative when said control signal is of a high value and said first switch control transistor is rendered inoperative and said second switch control transistor is rendered operative when said control signal is of a low value.

* * * * *